Figure 1:
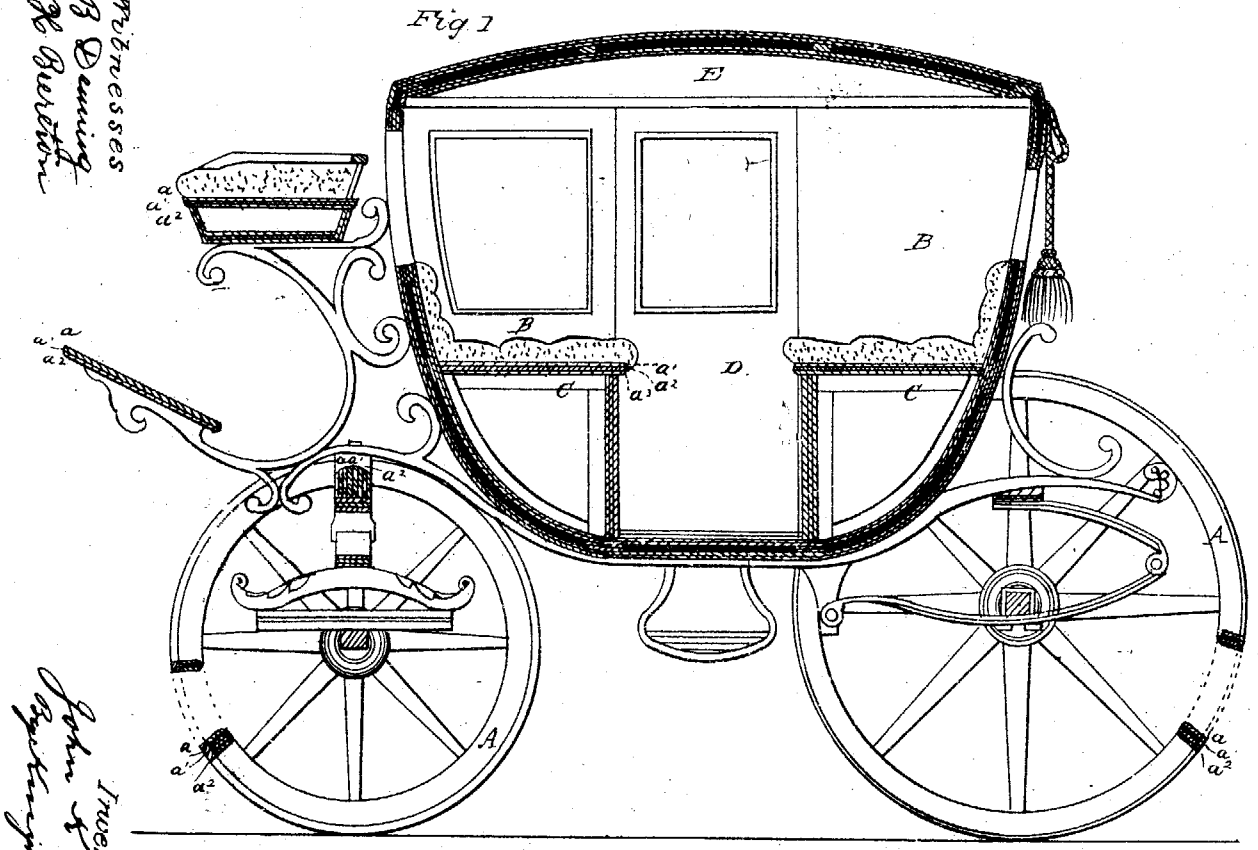

J. K. MAYO. 2 Sheets—Sheet 1.

Construction of Carriages, Cars, Coaches, &c.

No. 3,092.

Reissued Aug. 18, 1868.

Witnesses
W. B. Deming
W. H. Burton

Inventor:
John K. Mayo
By Knight Bros
Attys.

2 Sheets—Sheet 2.
J. K. MAYO.
Construction of Carriages, Cars, Coaches, &c.
No. 3,092.
Reissued Aug. 18, 1868.
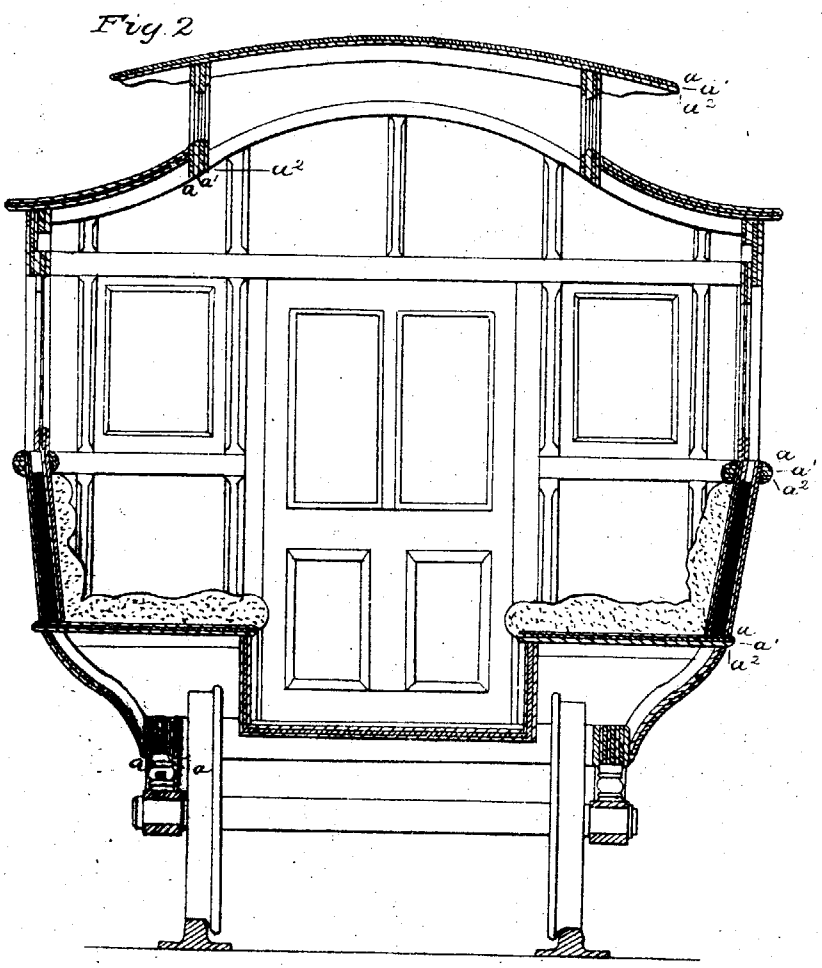
Witnesses
W. B. Daming
W. H. Brereton
Inventor
John K. Mayo
By Kingsbury
Atty.

UNITED STATES PATENT OFFICE.

JOHN K. MAYO, OF NEW YORK, N. Y., FOR HIMSELF, AND A. CUSHING AND G. B. CUSHING, OF ST. JOHN, NEW BRUNSWICK, ASSIGNEES OF JOHN K. MAYO.

IMPROVEMENT IN THE CONSTRUCTION OF CARRIAGES, CARS, COACHES, AND OTHER VEHICLES.

Specification forming part of Letters Patent No. 51,735, dated December 26, 1865; Reissue No. 3,092, dated August 18, 1868.

*To all whom it may concern:*

Be it known that JOHN K. MAYO, formerly of Portland, Maine, but now of the city, county, and State of New York, invented an Improvement in the Construction and Finishing of Carriages, Cars, Coaches, Hacks, and other Vehicles; and the following is hereby declared to be a sufficiently full, clear, and exact description thereof to enable one skilled in the art to which the said invention appertains to carry it into effect, reference being had to the accompanying drawings, which are made a part of this specification.

This invention relates to the construction of cars, carriages, or vehicles of various kinds, or parts thereof, of a plurality of scale-boards or thin sheets of wood cemented or otherwise firmly connected together, with the grain of the several scales or thicknesses crossed or diversified, so that they will afford to each other mutual strength, support, and protection against cracking, splitting, shrinking, or swelling.

The invention is applicable to the formation of cars for railroads, carriages, sleighs, carts, wheelbarrows, or parts thereof, frames, bodies, fellies, panels, tops, bows, steps, step-protectors, dress-guards, wheel-covers, dash-boards, whip-holders.

The superior strength and tenacity acquired by this mode of construction will recommend it at once as very superior for purposes of carriage-making of all descriptions.

Railroad-cars may be made very much lighter, and at the same time very much stronger, than by the present mode. They may also be made very much longer without risk of weakness, and more beautiful and elegant in form and finish with comparatively little expense, inasmuch as this material in process of manufacture may by the well-known process of wet and dry heating be made pliable, so as to assume any desired form without the labor of carving or paneling. The car may be made in sections or panels and put together by riveting, nailing, or screwing of the stiles, bolsters, or rails, all being formed in bold relief, thus adding strength without weight, as shown by the drawings. What is said of cars may also be applied to hacks and private carriages. For the tops of both this material is peculiarly adapted, as from its non-shrinkage principle it is not subject to leak.

It is not deemed necessary to enlarge upon all the various uses in carriage-making which this invention is adapted for.

In the drawings, Figure 1 represents a sectional view of a carriage or hack various parts of which are made of the improved material.

A is the rim of the wheel, which may be constructed in a single annulus. The layers may extend in the plane of the wheel or may be laid circumferentially. In either case the grain of the contiguous layers runs diversely. B B are the sides; C, the seat; D, the door; E, the top, each showing the laminated structure before explained.

Fig. 2 is a transverse sectional view of a railway-car the wood-work of which, as in the case of the carriage before described, is made up of separate scales or plates $a\ a'\ a^2$, connected together with grain crossed or diversified.

The following is what is claimed as new in the invention of the said JOHN K. MAYO:

The employment or use of the compound scale-board hereinbefore described in the formation of the specified or analogous articles and structures.

JOHN K. MAYO.

Witnesses:
EDWARD WILLARD,
W. V. FROST.